United States Patent
Cardoso et al.

(10) Patent No.: US 12,493,824 B2
(45) Date of Patent: Dec. 9, 2025

(54) GRAPHICAL USER INTERFACE FOR AUTOMATED MACHINE LEARNING MODEL DEVELOPMENT WITH DATA HEALTH ASSESSMENT

(71) Applicant: Hyland UK Operations Limited, Berkshire (GB)

(72) Inventors: Tiago Filipe Dias Cardoso, Brooklyn, NY (US); Pedro Miguel Dias Cardoso, Brooklyn, NY (US); Gethin Paul James, Brooklyn, NY (US); Isabel Maria Malheiro De Oliveira Novais Machado, Brooklyn, NY (US); Andrei Nechaev, Brooklyn, NY (US)

(73) Assignee: Hyland UK Operations Limited, Maidenhead (GB)

( * ) Notice: Subject to any disclaimer, the term of this patent is extended or adjusted under 35 U.S.C. 154(b) by 714 days.

(21) Appl. No.: 17/832,776

(22) Filed: Jun. 6, 2022

(65) Prior Publication Data
US 2023/0054850 A1   Feb. 23, 2023

Related U.S. Application Data

(63) Continuation of application No. 17/137,724, filed on Dec. 30, 2020, now Pat. No. 11,354,597.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| | | |
|---|---|---|
| 2006/0047617 A1 | 3/2006 | Bacioiu et al. |
| 2006/0161403 A1 | 7/2006 | Jiang et al. |
| | (Continued) | |

OTHER PUBLICATIONS

Roffo, Giorgio; Feature Selection Library (MATLAB Toolbox); arXiv:1607.01327v6 [cs.CV] Aug. 6, 2018; Total Pages: 8 (Year: 2018).*

(Continued)

*Primary Examiner* — Alan Chen
(74) *Attorney, Agent, or Firm* — Eschweiler & Potashnik, LLC

(57) ABSTRACT

Various embodiments are generally directed to techniques for intuitive machine learning (ML) development and optimization, such as for application in a content services platform (CSP), for instance. Many embodiments include a ML model developer and a ML model evaluator to provide a graphical user interface that guides ML layman in developing, evaluating, implementing, managing, and/or optimizing ML models. Some embodiments are particularly directed to a common interface that provides a step-by-step user experience to develop and implement ML techniques. For example, embodiments may include computing a health score for various aspects of developing and/or optimizing ML models, and using the health score, and the factors contributing thereto, to guide production of a valuable ML model. These and other embodiments are described and claimed.

20 Claims, 15 Drawing Sheets

(56) References Cited

U.S. PATENT DOCUMENTS

| | | |
|---|---|---|
| 2017/0017903 A1 | 1/2017 | Gray et al. |
| 2017/0372232 A1 | 12/2017 | Maughan et al. |
| 2018/0018587 A1 | 1/2018 | Kobayashi et al. |
| 2019/0147371 A1* | 5/2019 | Deo .................. G06N 20/20 706/12 |
| 2020/0012584 A1 | 1/2020 | Walters et al. |
| 2020/0050965 A1 | 2/2020 | Harvill et al. |
| 2020/0090075 A1 | 3/2020 | Achin et al. |
| 2020/0349438 A1 | 11/2020 | Takamatsu et al. |
| 2020/0380301 A1 | 12/2020 | Siracusa et al. |
| 2020/0387836 A1 | 12/2020 | Nasr-Azadani et al. |
| 2021/0055915 A1 | 2/2021 | Guo et al. |
| 2022/0180209 A1* | 6/2022 | Xu ....................... G06N 3/08 |

OTHER PUBLICATIONS

Non-Final Office Action dated Apr. 7, 2021 for U.S. Appl. No. 17/137,724.

Non-Final Office Action dated Jul. 26, 2021 for U.S. Appl. No. 17/137,724.

Notice of Allowance dated Feb. 8, 2022 for U.S. Appl. No. 17/137,724.

* cited by examiner

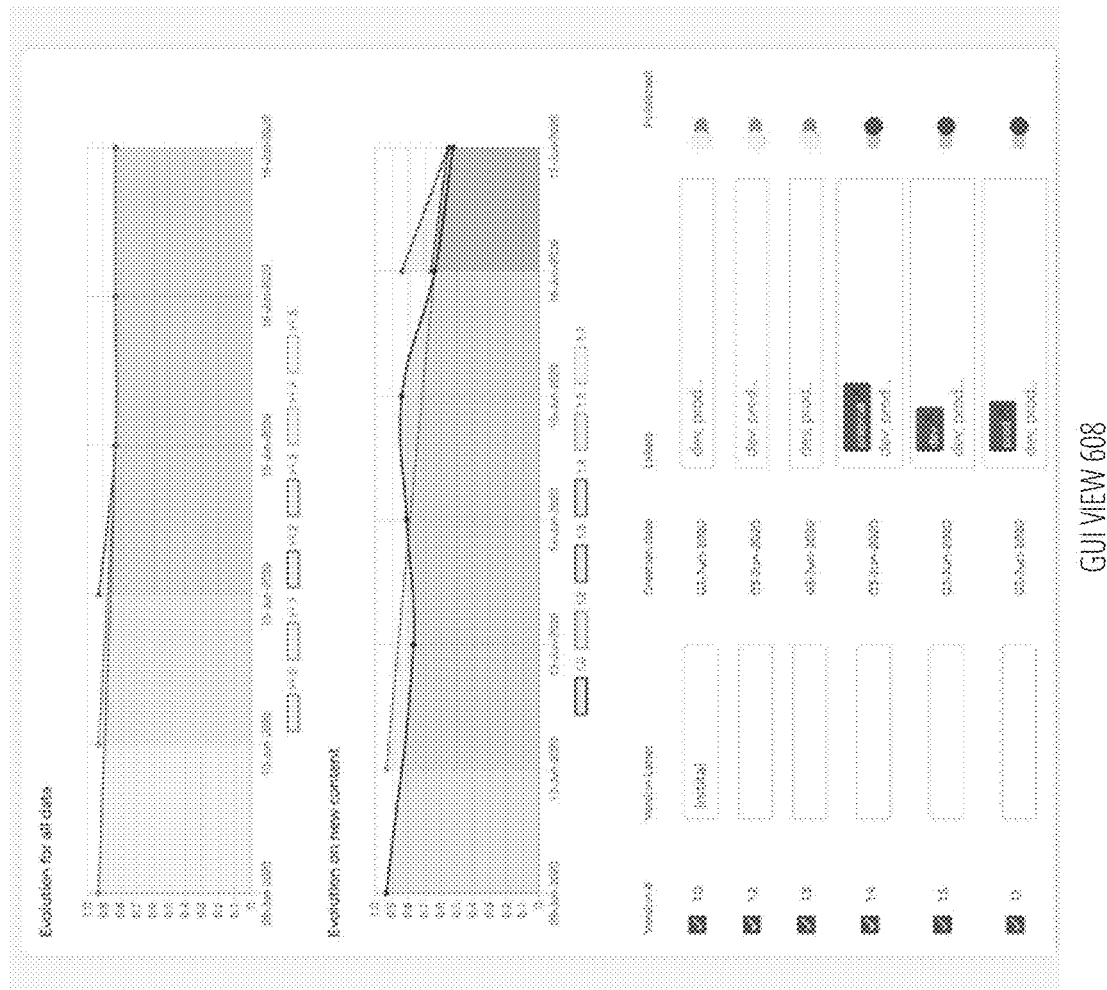

GRAPHICAL USER INTERFACE FOR AUTOMATED MACHINE LEARNING MODEL DEVELOPMENT WITH DATA HEALTH ASSESSMENT

REFERENCE TO RELATED APPLICATION

This application is a Continuation of U.S. application Ser. No. 17/137,724, filed on Dec. 30, 2020, the contents of which are hereby incorporated by reference in their entirety.

BACKGROUND

Machine learning is the study of computer algorithms that improve automatically through experience. Typically, machine learning algorithms build a model based on sample data, referred to as training data, in order to make predictions or decisions without explicitly being programmed to do so. Machine learning may utilize specialized software and/or hardware components that require integration to operate in conjunction with nonmachine learning software and/or hardware. For example, data must be sourced and prepared to generate training data. In another example, after a machine learning model is produced based on training data, the model needs to be deployed and hosted before use for making predictions or decisions.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates to an apparatus comprising a processor and a memory comprising instructions that when executed by the processor cause the processor to perform one or more of present, via a graphical user interface (GUI), a plurality of data sets available for development of machine learning (ML) models, wherein each data set comprises a plurality of samples; identify, based on input received via the GUI, a data set of the plurality of data sets for development of a ML model; determine a plurality of characteristics associated with each sample in the data set identified, wherein a value for each of the plurality of characteristics is assignable to each sample in the data set identified; compute a health of each characteristic in the plurality of characteristics, wherein health of a respective characteristic indicates a predictability of values for the respective characteristic; present, via the GUI, the plurality of characteristics associated with the data set and the health of each of the plurality of characteristics; identify, based on input received via the GUI, a target characteristics to predict values for; and develop the ML model to predict values for the target characteristic.

In various embodiments, the memory comprises instructions that when executed by the processor cause the processor to perform one or more of determine an action to improve the health of a characteristic of the plurality of characteristics; and present the action to improve the health of the characteristic via the GUI. In some embodiments, the action to improve the health of the characteristic comprises one or more of adding samples to the data set identified and assigning values for the characteristic to one or more samples. In many embodiments, the memory comprises instructions that when executed by the processor cause the processor to compute the health of each characteristic in the plurality of characteristics with an ML algorithm. In one or more embodiments, the memory comprises instructions that when executed by the processor cause the processor to perform one or more of compute a health of each data set in the plurality of data sets, wherein health of a respective data set indicates a potential for training an accurate ML model based on the respective data set; and present, via the GUI, the plurality of data sets available for development of machine learning (ML) models and the health of each of the plurality of data sets. In one or more such embodiments, the memory comprises instructions that when executed by the processor cause the processor to perform one or more of determine an issue with the data set of the plurality of data sets to compute a health of the data set; and present, via the GUI, the issue with the data set. In various such embodiments, the issue with the data set comprises insufficient samples in the data set. In many embodiments, the memory comprises instructions that when executed by the processor cause the processor to perform one or more of determine a set of candidate characteristics based on the target characteristic; compute a health of each candidate characteristic, wherein health of a respective candidate characteristic indicates potential to be a predictor for the target characteristic; and present, via the GUI, the set of candidate characteristics and the health of each of the candidate characteristics. In many such embodiments, the memory comprises instructions that when executed by the processor cause the processor to perform one or more of identify, based on input received via the GUI, a set of predictor characteristics to utilize in prediction of values for the target characteristic; and develop the ML model to predict values for the target characteristic based on values for the set of predictor characteristics. In several such embodiments, the memory comprises instructions that when executed by the processor cause the processor to perform one or more of determine an action to improve the health of a candidate characteristic in the set of candidate characteristics; and present the action to improve the health of the candidate characteristic via the GUI. In some such embodiments, the action to improve the health of the characteristic comprises assigning values for the characteristic to one or more samples.

In another aspect, the present disclosure relates to at least one non-transitory computer-readable medium comprising a set of instructions that, in response to being executed by a processor circuit, cause the processor circuit to perform one or more of present, via a graphical user interface (GUI), a plurality of data sets available for development of machine learning (ML) models, wherein each data set comprises a plurality of samples; identify, based on input received via the GUI, a data set of the plurality of data sets for development of a ML model; determine a plurality of characteristics associated with each sample in the data set identified, wherein a value for each of the plurality of characteristics is assignable to each sample in the data set identified; compute a health of each characteristic in the plurality of characteristics, wherein health of a respective characteristic indicates a predictability of values for the respective characteristic; present, via the GUI, the plurality of characteristics associated with the data set and the health of each of the plurality of characteristics; identify, based on input received via the GUI, a target characteristics to predict values for; and develop the ML model to predict values for the target characteristic.

Some embodiments comprise instructions that, in response to being executed by the processor circuit cause the processor circuit to perform one or more of determine an issue with a characteristic of the plurality of characteristics to compute a health of the characteristic; and present the issue with the characteristic via the GUI. In some such embodiments, the issue with the characteristic comprises one or more of insufficient samples in the data set and insufficient values in the samples for the characteristic. Various such embodiments comprise instructions that, in response to being executed by the processor circuit cause the processor circuit to perform one or more of determine a possible solution to the issue with the characteristic; and present the possible solution to the issue via the GUI. In many such embodiments, the possible solution to the issue comprises one or more of adding samples to the data set identified and assigning values for the characteristic to one or more samples. Various such embodiments comprise instructions that, in response to being executed by the processor circuit cause the processor circuit to present, via the GUI, a link to add samples to the data set identified or assign values for the characteristic to one or more samples.

In yet another aspect, the present disclosure relates to a computer-implemented method comprising one or more of presenting, via a graphical user interface (GUI), a plurality of data sets available for development of machine learning (ML) models, wherein each data set comprises a plurality of samples; identifying, based on input received via the GUI, a data set of the plurality of data sets for development of an ML model; determining a plurality of characteristics associated with each sample in the data set identified, wherein a value for each of the plurality of characteristics is assignable to each sample in the data set identified; and computing a health of each characteristic in the plurality of characteristics, wherein health of a respective characteristic indicates a predictability of values for the respective characteristic.

In some embodiments, the computer-implemented method includes one or more of presenting, via the GUI, the plurality of characteristics associated with the data set and the health of each of the plurality of characteristics; identifying, based on input received via the GUI, a target characteristic to predict values for; and developing the ML model to predict values for the target characteristic. In various embodiments, the computer-implemented method includes one or more of determining a set of candidate characteristics based on the target characteristic; computing a health of each candidate characteristic, wherein health of a respective candidate characteristic indicates potential to be a predictor for the target characteristic; and presenting, via the GUI, the set of candidate characteristics and the health of each of the candidate characteristics.

BRIEF DESCRIPTION OF THE SEVERAL VIEWS OF THE DRAWINGS

FIG. 6D illustrates an exemplary GUI view for ML model evaluation according to one or more embodiments described hereby.

DETAILED DESCRIPTION

Figure 1:
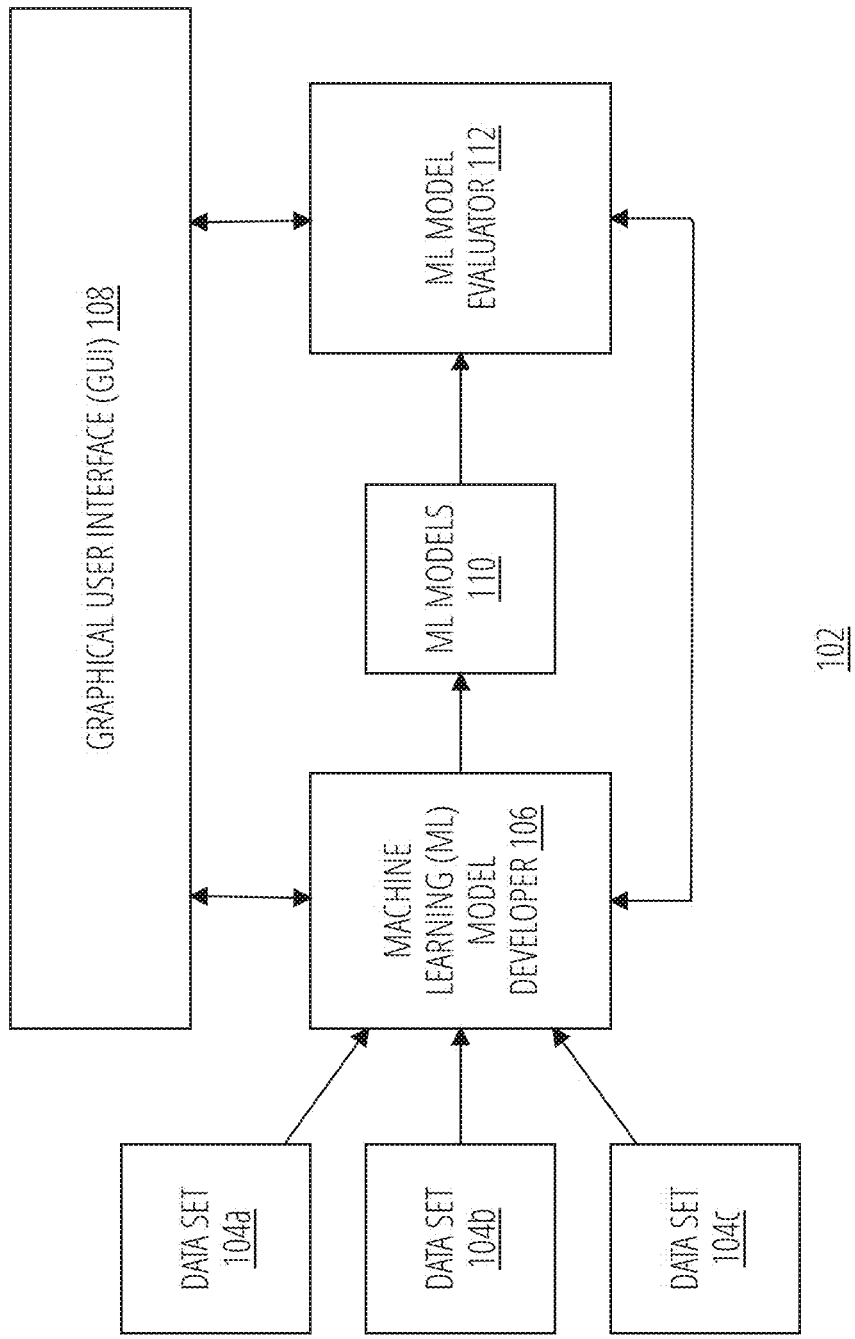
FIG. 1 illustrates an exemplary computing environment according to one or more embodiments described hereby.

Various embodiments are generally directed to techniques for intuitive machine learning (ML) development and optimization, such as for application in a content services platform (CSP), for instance. Many embodiments include a ML model developer and a ML model evaluator to provide a graphical user interface that guides ML layman in developing, evaluating, implementing, managing, and/or optimizing ML models. Some embodiments are particularly directed to a common interface that provides a step-by-step user experience to develop and implement ML techniques. For example, embodiments may include computing a health score for various aspects of developing and/or optimizing ML models, and using the health score, and the factors contributing thereto, to guide production of a valuable ML model. These and other embodiments are described and claimed.

Many challenges face machine learning development and optimization. Typically, in ML projects/use cases, there is a need for multiple roles. For instance, an ML expert may provide the tools and development to generate ML models and a use-domain expert to identify valuable objectives, priorities, and a sense of practicality. However, these two roles work in different fields with different contexts, leading to challenges in effective communication and missed opportunities. Use-domain experts, such as a businessman, may be trained in a broad but scoped context of ML practical application in a dynamic content domain. However, maintaining an effective ML model over time can require constant adaptation to have accurate models and solutions, leading to unanticipated challenges. Thus, use-domain experts lack the technical capabilities to replace an ML expert. Adding further complexity, ML development tools require expert knowledge that prevents a layman from navigating and taking advantage of the ML custom model universe for various content. Such limitations can drastically reduce the accessibility of ML techniques, contributing to lost economies of scale, missed insights, and inefficient systems, devices, and techniques with limited capabilities.

Various embodiments described hereby provide a user interface and a user experience that provides simplified and understandable feedback, heuristics, and knowledge about applied ML on content that a layman can understand and use to create ML models. In many embodiments, heuristics with problems and potential solutions, such as regarding content (e.g., data set), may be provided. In many such embodiments, this may facilitate understanding of how content will behave and enable performant ML models to be created against the content. In several embodiments, solutions may be provided that include a plan to improve content. In several such embodiments, the solutions provided may enable new ML models and use cases. Some embodiments include a wizard-like user experience that takes a user step-by-step, asking simple and understandable questions to guide the creation of ML models with utility. In many embodiments, health scores may be generated to provide feedback and convey status. Many embodiments provide feedback and visualization on model performance. Various embodiments provide analytics on model performance against new content. Multiple embodiments include a one-click interface, such as for retraining or reoptimizing models. Many embodiments provide visualization and data on the usage of models, such as on content from repositories. Several embodiments provide simplified governance to select and activate models, or versions thereof, in one or more environments. Various embodiments enable use-domain experts to experiment on creating ML models to fit different use cases, and to follow model progress and usage.

Many embodiments provide users with an intuitive interface system that enable users to derive value from ML by providing a uniform user experience with intuitive functionalities to implement the predictive power of ML models. The interface system may guide users through the operation and configuration of various aspects of the ML integrator including analysis, interpretation, and/or resolution of associated data, issues, and results. In another example, the interface system may allow a bulk action to be run on lists of documents (e.g., from search, folder, collection) that asks one or more ML models for predictions. In such examples, the results may be filled in depending on thresholds that are configurable via the interface system. In yet another example, each time a form is accessed to create or edit content, suggestions for the new content may automatically be provided from model predictions. Many embodiments allow bulk predictions to be applied in a safe way that enables the scalability of AI to be tapped into.

In these and other ways, components/techniques described here may identify methods to increase efficiency, decrease performance costs, decrease computational cost, and/or reduce resource requirements to utilize ML in an accurate, customizable, efficient, dynamic, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include integrating ML with a CSP. Further, one or more of the aspects, techniques, and/or components described hereby may be utilized to improve the technical fields of ML, ML development, user experience, user interface, CSPs, and/or content management.

In several embodiments, components described hereby may provide specific and particular manners to enable development, evaluation, management, and optimization of ML models. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as computing health scores for various aspects of developing and/or optimizing ML models. In another example, the health scores, and the factors contributing thereto, may be used to guide development of a valuable ML model. In yet another example, suggestions to improve health scores may be provided to improve ML models being developed.

With general reference to notations and nomenclature used hereby, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, whereby like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 102 according to one or more embodiments described hereby. Operating environment 102 may include data sets 104a, 104b, 104c (or data sets 104), ML model developer 106, graphical user interface (GUI) 108, one or more ML models 110, and ML model evaluator 112. In various embodiments, ML model developer 106 may utilize GUI 108 to guide a user to develop ML models 110 based on one or more of the data sets 104. In several embodiments, ML model evaluator 112 may utilize GUI 108 to guide a user to evaluate, manage, and/or optimize the ML models 110. Embodiments are not limited in this context.

One or more embodiments enable users to train custom ML models (e.g., ML models 110) on enterprise content (e.g., data sets 104). These ML models may be used for a variety of business purposes, including enriching content with new metadata, auto-classifying records, identifying products and talent, and even automating forms of processing. Further, many embodiments include a low-code user interface and user experience that enables a user to develop the proper training data set to produce the results they seek. Additionally, the low-code user interface and user experience enables users to understand how models are performing and whether, over time, the performance is improving or degrading. In several embodiments, the low-code user interface and user experience offers an intuitive, guided "point-and-click" experience that enables layman to define and train ML model, and then deploy and administer these models in production use cases. Further, users can efficiently navigate through an available set of document types (data sets) and then, with a few clicks, select the various values and data types that we want the new model to populate. Different parameters can also be applied for each prediction. Additional model deployment and administration features may be relevant to aspects of the embodiments herein, as described in more detail in U.S. patent application Ser. No. 17/137,746, now patent as U.S. Pat. No. 11,568,319, filed on Dec. 30, 2020, and titled "Techniques for Dynamic Machine Learning Integration," the entirety of which application is incorporated by reference herein.

Figure 2A:
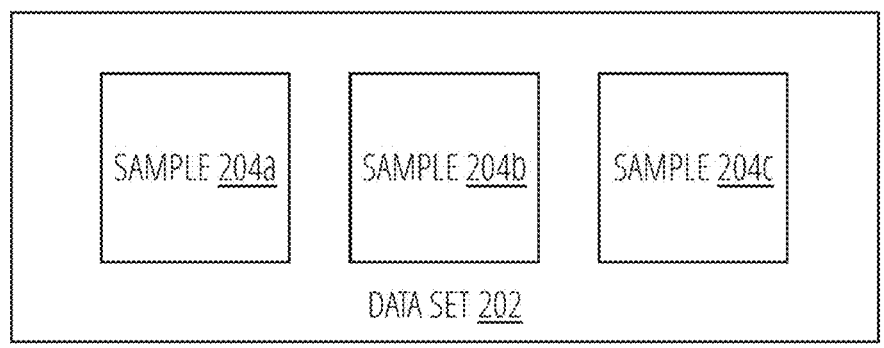
FIG. 2A illustrates an exemplary data set according to one or more embodiments described hereby.

FIG. 2A illustrates an exemplary data set 202 according to one or more embodiments described hereby. In the illustrated embodiment, data set 202 includes one or more samples 204a, 204b, 204c (or samples 204). In various embodiments, data set 202 may be used to train one or more ML models. For example, ML model developer 106 may generate one or more of ML models 110 based on data set 202. In one or more embodiments, each of samples 204 may include an instance or occurrence of content. For example, each of the samples 204 may include an image from a product photo shoot. In another example, each of samples 204 may include documents generated by a business, such as purchase orders. Many embodiments may include components to analyze the data set 202. In many such embodiments, analysis of data set 202 may include determination of one or more of a health score, an issue, and a possible solution for the issue. In some embodiments, FIG. 2A may include one or more components that are the same or similar to one or more other components described hereby. For example, data set 202 may be the same or similar to one or more of data sets 104. Embodiments are not limited in this context.

Figure 2B:
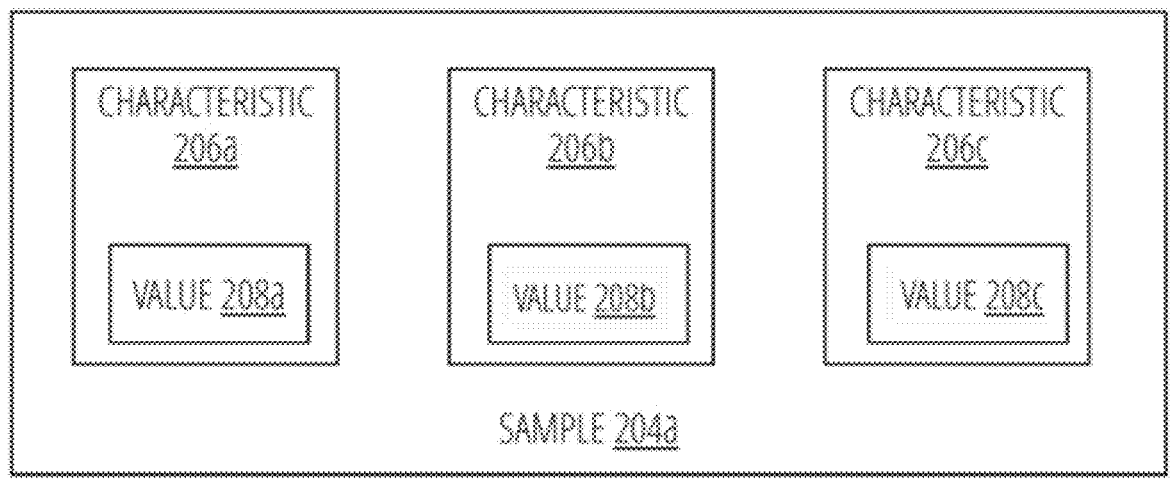
FIG. 2B illustrates an exemplary sample according to one or more embodiments described hereby.

FIG. 2B illustrates exemplary sample 204a according to one or more embodiments described hereby. In the illustrated embodiment, sample 204a includes one or more characteristics 206a, 206b, 206c (or characteristics 206), and each of the characteristics 206 includes a value 208a, 208b, 208c. Generally, a characteristic may represent a defined feature of a sample, and the feature is defined by the value. For example, characteristic 206a may include product color and value 208a may include blue, characteristic 206b may include product material and value 208b may include wood, and characteristic 206c may include product category and value 208c may include seating. In another example, characteristics 206 may include different cells in a spread sheet with values 208 corresponding to the contents of the different cells. In many embodiments, each of the characteristics 206 may comprise a key-value pair. In one or more such embodiments, ML techniques disclosed hereby may be utilized to identify patterns among characteristics of different samples in a data set. The identified patterns may then be utilized to infer characteristics of other instances or occurrences of similar content (via an ML model). Many embodiments may include components to analyze the sample 204a. In many such embodiments, analysis of sample 204a may include determination of one or more of a health score, an issue, and a possible solution for the issue. In some embodiments, FIG. 2B may include one or more components that are the same or similar to one or more other components described hereby. For example, sample 204a may be the same or similar to one or more of sample 204b and sample 204c. Embodiments are not limited in this context.

Figure 3:
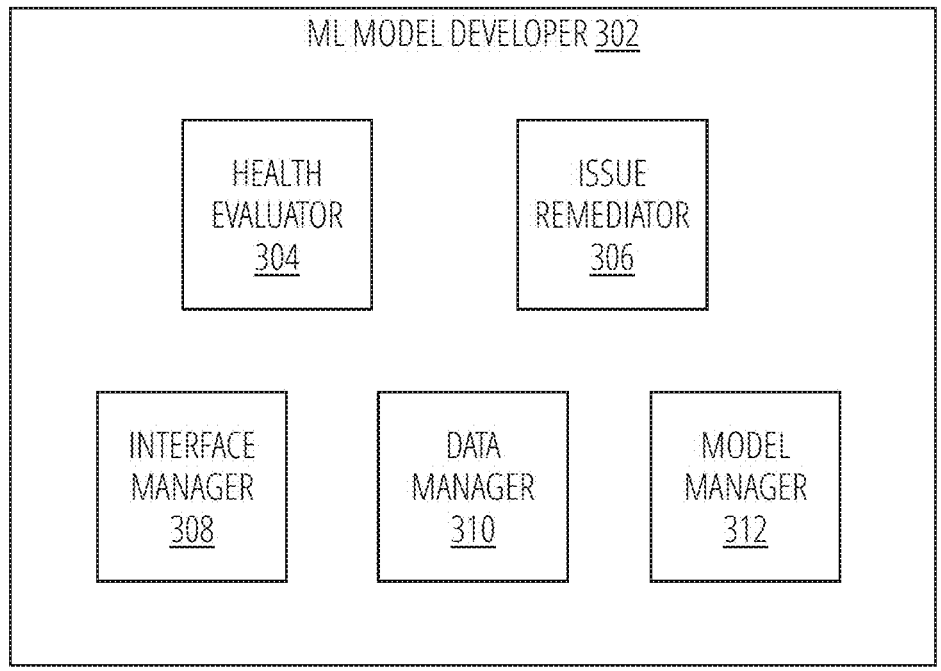
FIG. 3 illustrates an exemplary machine learning (ML) model developer according to one or more embodiments described hereby.

FIG. 3 illustrates an exemplary ML model developer 302 according to one or more embodiments described hereby. In the illustrated embodiment, ML model developer 302 includes a health evaluator 304, an issue remediator 306, an interface manager 308, a data manager 310, and a model manager 312. In various embodiments, the components of ML model developer 302 may interoperate to provide an intuitive user experience via a GUI for creating an ML model. In some embodiments, FIG. 3 may include one or more components that are the same or similar to one or more other components described hereby. For example, ML model developer 302 may be the same or similar to ML model developer 106. Embodiments are not limited in this context.

In some embodiments, data manager 310 may identify one or more data sets to use for training an ML model. In various embodiments, data manager 310 may source, format, filter, and/or transform data for training ML models. In one or more embodiments, the data manager 310 may produce one or more training data sets from the data sets. Health evaluator 304 may analyze the one or more data sets to generate health scores for the one or more data sets. In generating health scores for the one or more data sets, health evaluator 304 may identify one or more issues affecting the health score. For example, health evaluator determines a data set includes 100 samples. In such examples, health evaluator 304 may determine the data set has an issue with the sample count and decrease the health score accordingly. When health evaluator 304 identifies an issue, issue remediator 306 may determine one or more possible solutions to the issue. Returning to the previous example, issue remediator 306 may identify adding more samples to the data set as a potential solution to the issue. Further, issue remediator 306 may identify one or more potential sources for the additional samples.

Interface manager 308 may present the information regarding the data sets in a guided format via a GUI. Further, the interface manager 308 may utilize step-by-step guidance to present relative information, including health scores, issues, and possible solutions, to assist in the selection of a data set for model generation. After selection of the data set, model manager 312 may, in a similar fashion to data manager 310, operate in conjunction with health evaluator 304, issue remediator 306, and interface manager 308 to utilize step-by-step guidance to present relative information, including health scores, issues, and possible solutions, to assist in the configuration and generation of an ML model. In some embodiments, interface manager 308 may present various ML methods for selection, along with corresponding health scores, issues, and possible solutions based on the data set previously selected. In such embodiments, health evaluator 304 and issue remediator 306 may be utilized to compute the corresponding health scores, issues, and possible solutions.

In several embodiments, interface manager 308 may guide a user in selection of target characteristics and predictor characteristics. In several such embodiments, interface manager 308 may present available characteristics for selection, along with corresponding health scores, issues, and possible solutions based on the data set and/or ML method previously selected. In various embodiments, a target characteristic is the characteristic value an ML model infers, and predictor characteristics are characteristic values used by the ML model to infer the value of the target characteristic. At the conclusion of the user experience provided by interface manager 308, model manager 312 may produce an ML model based on the data set selected. Additionally, the ML model may predict values for a selected target characteristic based on values for a set of selected predictor characteristics. In many embodiments, the set of predictor characteristics may be selected from a set of candidate characteristics and corresponding health for the candidate characteristics. In many such embodiments, the health for the candidate characteristics may indicate an ability to predict the target characteristics based on the corresponding candidate characteristic. Aspects of the user experience provided by interface manager 308 will be described in more detail below, such as with respect to FIGS. 5A-5C.

In many embodiments, one or more components of ML model developer 302 may utilize ML techniques and/or algorithms. For example, health evaluator 304 may utilize an ML model generated from historical data sets and corresponding health scores to compute the health score during analysis of a data set. In another example, interface manager 308 may utilize previous user responses in training an ML model to determine useful information to present via a GUI. In yet another example, health evaluator 304 may utilize an ML model to identify performant predictor characteristics based on a selected method of ML. Various embodiments guide users to experiment on creating ML models to fit different use cases, enabling the development and utilization of valuable ML models in a variety of unique scenarios.

Once a user has completed configuration of the new model, training can be initiated. When training is initiated, the data manager 310 and model manager 312 may automatically extract the appropriate content and data for training, perform any necessary renditions or transformations, and export the model and corresponding training set to an external service for training. In various embodiments, real-time updates on the training process, tracking progress of the data export, and the training are provided (see e.g., FIG. 6A). Additionally, users may be notified of any errors that occur.

Figure 4:
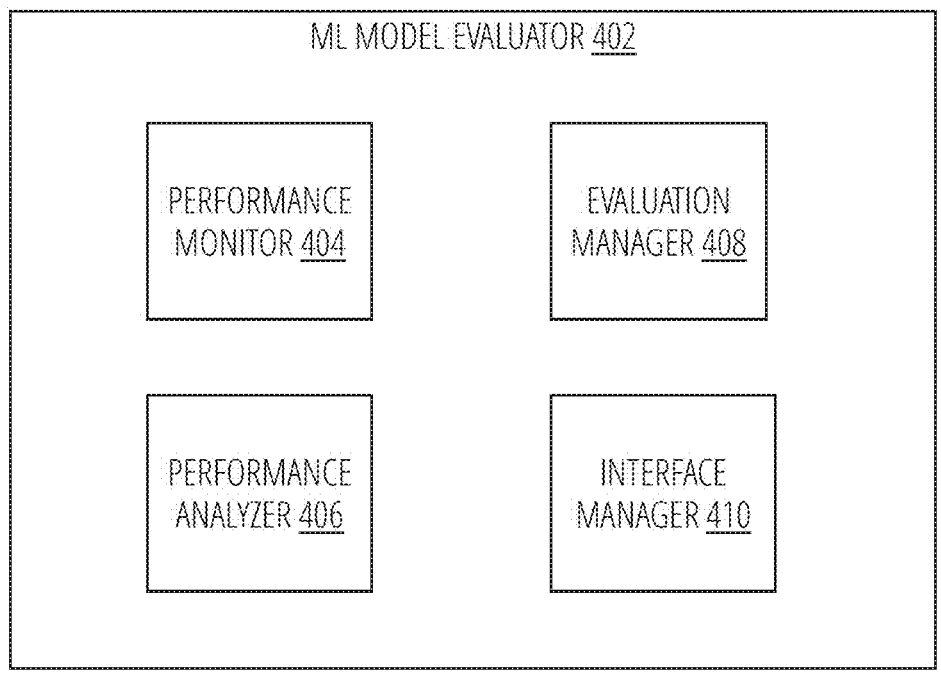
FIG. 4 illustrates an exemplary ML model evaluator according to one or more embodiments described hereby.

FIG. 4 illustrates an exemplary ML model evaluator 402 according to one or more embodiments described hereby. In the illustrated embodiment, ML model evaluator 402 includes a performance monitor 404, a performance analyzer 406, evaluation manager 408, and an interface manager 410. In many embodiments, the components of ML model evaluator 402 may interoperate to provide an intuitive user experience via a GUI for evaluating, managing, and/or optimizing ML models. Some embodiments provide feedback and visualization on model performance. Various embodiments provide analytics on model performance against new content. Multiple embodiments include a one-click interface, such as for retraining or reoptimizing models. Many embodiments provide visualization and data on the usage of models, such as on content from repositories. In some embodiments, FIG. 4 may include one or more components that are the same or similar to one or more other components described hereby. For example, interface manager 410 may be the same or similar to interface manager 308. Embodiments are not limited in this context.

In many embodiments, the performance monitor 404 may track and log performance metrics regarding one or more ML models. In several embodiments, the performance analyzer 406 may compute analytics and generate graphics based on the performance metrics. In some embodiments, evaluation manager 408 may enable performance goals to be set and monitored. In some such embodiments, evaluation manager 408 may identify one or more issues with achieving a performance goal. In various embodiments, evaluation manager 408 may produce one or more possible solutions to achieving performance goals. In many embodiments, interface manager 410 may generate user interfaces and a user experience to guide a user through interpreting data and deriving value from the data. In some embodiments, real-time updates on the training process, tracking progress of the data export, and the training are provided by ML model evaluator 402 (see e.g., FIG. 6A). Aspects of the user experience provided by interface manager 410 will be described in more detail below, such as with respect to FIGS. 6A-6F.

Figure 5A:
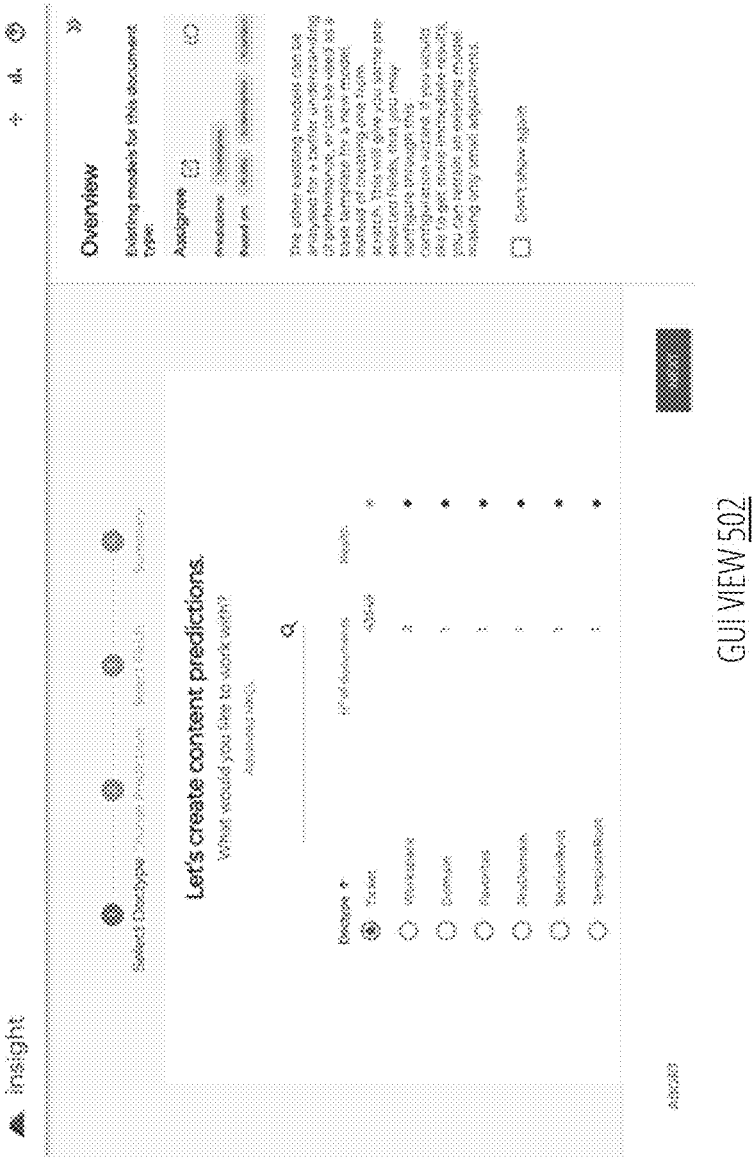
FIG. 5A illustrates an exemplary graphical user interface (GUI) view for ML model development according to one or more embodiments described hereby.

FIG. 5A illustrates an exemplary GUI view 502 according to one or more embodiments described hereby. In various embodiments, GUI view 502 may be generated on GUI 108 by ML model developer 106. In many embodiments, GUI view 502 may be generated by interface manager 308 as part of an intuitive user experience for creating an ML model. GUI view 502 includes an interface for selecting a data set for generating an ML model. In some embodiments, FIG. 5A may include one or more components that are the same or similar to one or more other components described hereby. For example, GUI view 502 may be the same or similar as a state of GUI 108. In other words, GUI view 502 may be presented via GUI 108. Embodiments are not limited in this context.

Many embodiments may include an overview of the model development process and an indication of where in the model development process a user is. In the illustrated embodiment, the overview includes a first step, 'Select Doctype', a second step, 'Choose Predictions', a third step, 'Select Fields', and a fourth step, 'Summary'. The first step may correspond to selecting the data set for developing a model. The second step may correspond to selecting the target characteristic to predict. The third step may correspond to selecting the set of predictor characteristics from a set of candidate characteristics to utilize to predict or infer the target characteristic.

Figure 5B:
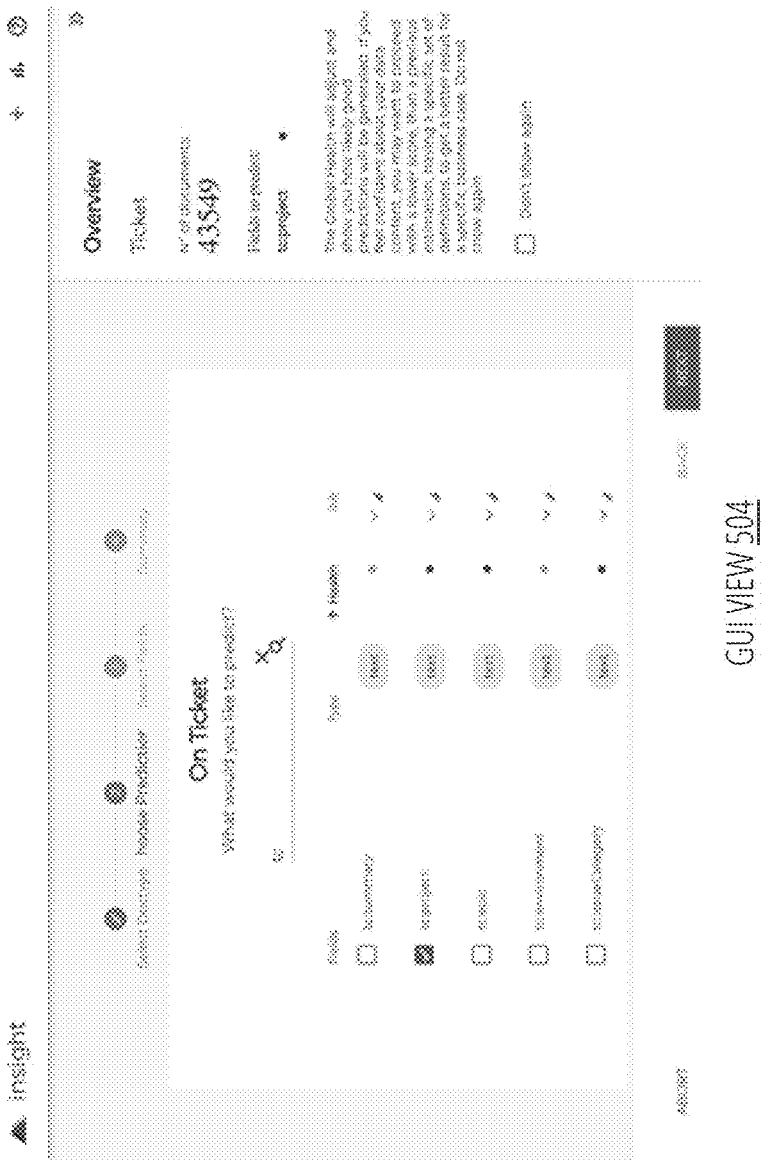
FIG. 5B illustrates an exemplary GUI view for ML model development according to one or more embodiments described hereby.
Figure 5C:
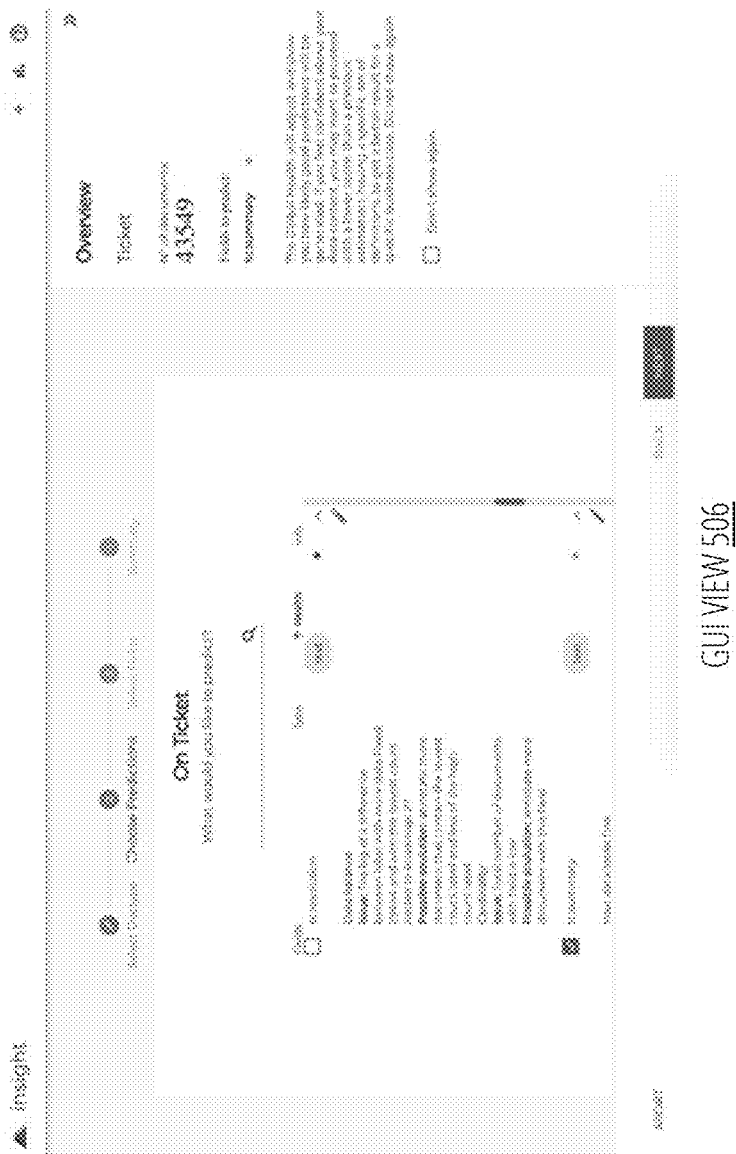
FIG. 5C illustrates an exemplary GUI view for ML model development according to one or more embodiments described hereby.

Referring to FIG. 5A, GUI view 502 illustrates aspects of the first step corresponding to selecting a data set for developing a model. The illustrated embodiment includes a column for data sets (i.e., doctype), a column for number of samples (i.e., documents) in the data set, and a column for health scores of the different data sets. In FIGS. 5A-5C, lighter colors may indicate higher health scores while darker colors indicate lower health scores. Some embodiments may utilize a semaphore analogy, such as with green, yellow, and red. In various embodiments, the health scores for 'Workspace', 'Domain', 'Favorites', JoraDomain', 'SectionRoot', and 'TemplateRoot' may be lower than the health score for 'Ticket' at least in part based on 'Ticket' having 43549 samples while the other data sets (i.e., doctypes) include two or fewer samples.

Additionally, the GUI view 502 may provide additional relevant information in a side panel, such as more detailed information for an identified data set. Accordingly, in the illustrated embodiment, additional information regarding 'Ticket' is provided. The additional information includes existing models for the identified data set, as well as the target characteristic (tc:assignee) and the set of predictor characteristics (dc:title, tc:description, and tc:project). Further, GUI view 502 includes some insights regarding the additional information provided. In the illustrated embodiment, the insight provides that the "other existing models can be analyzed for a better understanding of performance, or can be used as a base template for a new model instead of creating a model from scratch. This will provide some pre-selected fields that can be configured through the interface. If more immediate results are desired, you can retrain an existing model, making only small adjustments." It will be appreciated that by clicking 'next' at the bottom, an identified data set may transition into a selected data set.

FIG. 5B illustrates an exemplary GUI view 504 according to one or more embodiments described hereby. In various embodiments, GUI view 504 may be generated on GUI 108 by ML model developer 106. In many embodiments, GUI view 504 may be generated by interface manager 308 as part of an intuitive user experience for creating an ML model. GUI view 504 includes an interface for selecting one or more target characteristics for generating an ML model. In some embodiments, FIG. 5B may include one or more components that are the same or similar to one or more other components described hereby. For example, GUI view 504 may be the same or similar as a state of GUI 108. In other words, GUI view 504 may be presented via GUI 108. Embodiments are not limited in this context.

GUI view 504 illustrates aspects of the second step corresponding to selecting one or more target characteristics for developing a model. Accordingly, the overview of the model development process indicates such. The illustrated embodiment includes a column for characteristics (i.e., fields), a column for type (e.g., text), a column for health scores of the different characteristics, and a column for additional information. Additionally, the GUI view 502 may provide additional relevant information in a side panel, such as more detailed information on the data set and for an identified characteristic. Accordingly, in the illustrated embodiment, the number of documents (e.g., samples) in 'Ticket' is identified as 43,549, and additional information regarding characteristic 'tc:project' is provided. The additional information includes some insights regarding the identified characteristic. In the illustrated embodiment, the insight provides that the "Global Health will adjust and show how likely good predictions will be generated. If you feel confident about your data content, you may want to proceed with a lower score, than a previous estimation, having a specific set of definitions, to get a better result for a specific business case." It will be appreciated that by clicking 'next' at the bottom an identified characteristic may transition into selected characteristics.

FIG. 5C illustrates an exemplary GUI view 506 according to one or more embodiments described hereby. In various embodiments, GUI view 506 may be generated on GUI 108 by ML model developer 106. In many embodiments, GUI view 506 may be generated by interface manager 308 as part of an intuitive user experience for creating an ML model. In several embodiments, GUI view 506 includes an interface for selecting one or more target characteristics for generating an ML model. In some embodiments, FIG. 5C may include one or more components that are the same or similar to one or more other components described hereby. For example, GUI view 506 may be the same or similar as a state of GUI 108. In other words, GUI view 506 may be presented via GUI 108. Embodiments are not limited in this context.

GUI view 506 may be the same as GUI view 504 except that issues and possible solutions are presented. In the illustrated embodiment, issues with data balance and cardinality are indicated, along with possible solutions. The data balance issue includes "too big of a difference between label with more data. Fixed: 29444 and with the lowest count. Added to Roadmap: 27". The possible solution to the data balance issue includes annotating more documents (adding values to samples) that contain the lowest count label and less of the high count label. For example, if category A includes many times (e.g., 100-1000×) more samples than category B, a model may overlearn about A and not enough about B. In such examples, this may result in a model with a bias that leans more toward predicting category A than B, even in a situation that B is correct. More generally, a model trained on unbalanced data is more likely to erroneously determine a certain value for a category is frequent and likely to occur and/or erroneously determine a certain value for a category is rare and unlikely to occur, which can drastically affect model performance.

The cardinality issue includes the total number of documents with the field (number of samples with values for the characteristic) being low. The possible solution to the cardinality issue includes annotating more documents with the field (adding values for the field to samples). In some embodiments, a link to perform the possible solution may be provided. For example, a link to annotate the suggested documents may be provided. In one or more embodiments, heuristics for annotating the suggested documents may be provided.

In many embodiments, the user experience can readily be tailored and/or extended, such as by adding additional heuristics. For example, some embodiments may include additional heuristics for explaining data health, such as based on data statistics.

Figure 6A:
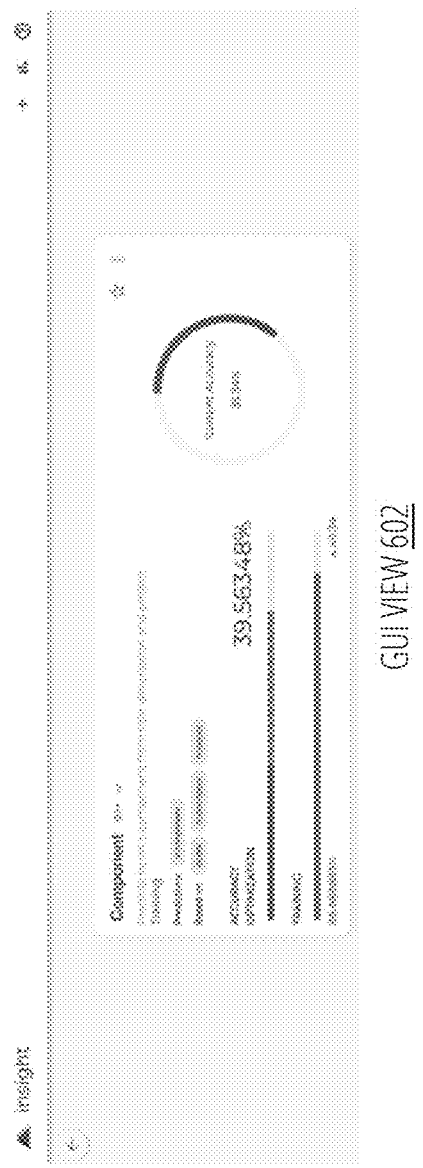
FIG. 6A illustrates an exemplary GUI view for ML model evaluation according to one or more embodiments described hereby.

FIG. 6A illustrates an exemplary GUI view 602 according to one or more embodiments described hereby. In various embodiments, GUI view 602 may be generated on GUI 108 by ML model developer 106 or ML model evaluator 112. In many embodiments, GUI view 602 may be generated by interface manager 410 as part of an intuitive user experience for evaluating, managing, and/or optimizing an ML model. In several embodiments, GUI view 602 includes an evaluation of an ML model during and immediately after training. GUI view 602 includes a textual summary of the model being evaluated. In the illustrated embodiment, the textual summary provides that the model predicts tickets component (tc:components) from title (dc:title), description (tc:description), and project (tc:project). Additionally, GUI view 602 includes an accuracy optimization illustration, a training progress illustration, and a current accuracy illustration. In some embodiments, FIG. 6A may include one or more components that are the same or similar to one or more other components described hereby. For example, GUI view 602 may be the same or similar as a state of GUI 108. In other words, GUI view 602 may be presented via GUI 108. Embodiments are not limited in this context.

Figure 6B:
FIG. 6B illustrates an exemplary GUI view for ML model evaluation according to one or more embodiments described hereby.

FIG. 6B illustrates an exemplary GUI view 604 according to one or more embodiments described hereby. In various embodiments, GUI view 604 may be generated on GUI 108 by ML model developer 106 or ML model evaluator 112. In many embodiments, GUI view 604 may be generated by interface manager 308 or interface manager 410 as part of an intuitive user experience for evaluating, optimizing, and/or managing ML models. GUI view 604 includes a dashboard that depicts available ML models, including those that are in training and in production. Further, a set of filters is available to enable a user to efficiently locate relevant models. In some embodiments, FIG. 6B may include one or more components that are the same or similar to one or more other components described hereby. For example, GUI view 604 may be the same or similar as a state of GUI 108. In other words, GUI view 604 may be presented via GUI 108. Embodiments are not limited in this context.

Figure 6C:
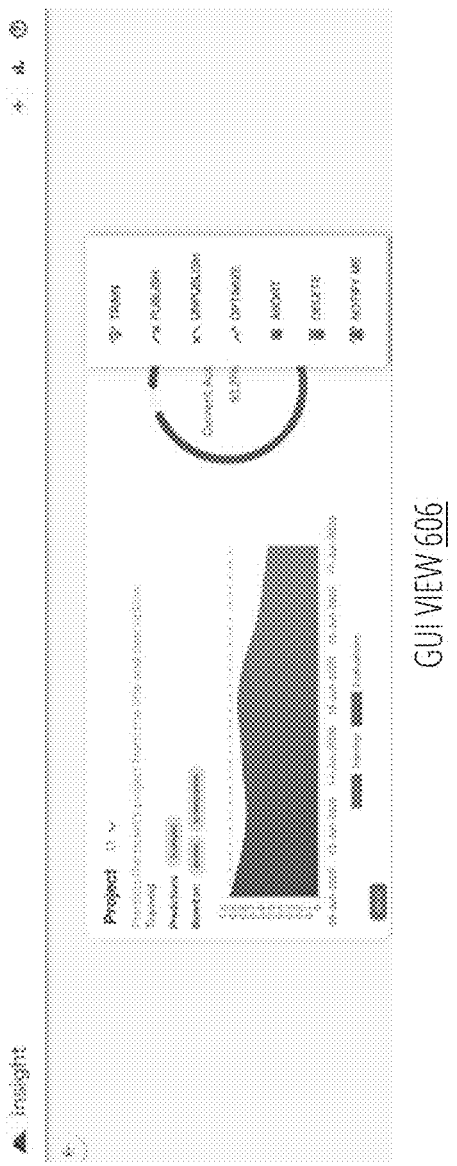
FIG. 6C illustrates an exemplary GUI view for ML model evaluation according to one or more embodiments described hereby.

FIG. 6C illustrates an exemplary GUI view 606 according to one or more embodiments described hereby. In various embodiments, GUI view 606 may be generated on GUI 108 by ML model developer 106 or ML model evaluator 112. In many embodiments, GUI view 606 may be generated by interface manager 308 or interface manager 410 as part of an intuitive user experience for evaluating, optimizing, and/or managing ML models. GUI view 606 illustrates that with a single-click options can be provided for a model that include train, publish, unpublish, optimize, abort, delete, and notify me. The publish and unpublish options can switch an ML model the development environment and the production environment. Further, the notify me option can allow a user to set notifications and/or objectives related to performance of the model. In some embodiments, FIG. 6C may include one or more components that are the same or similar to one or more other components described hereby. For example, GUI view 606 may be the same or similar as a state of GUI 108. In other words, GUI view 606 may be presented via GUI 108. Embodiments are not limited in this context.

FIG. 6D illustrates an exemplary GUI view 608 according to one or more embodiments described hereby. In various embodiments, GUI view 608 may be generated on GUI 108 by ML model developer 106 or ML model evaluator 112. In many embodiments, GUI view 608 may be generated by interface manager 308 or interface manager 410 as part of an intuitive user experience for evaluating, optimizing, and/or managing ML models. GUI view 608 illustrates a graphical representation of the performance of production models over time. In several embodiments, the performance of different models and/or versions may be compared over time. In some embodiments, the performance of different models and/or versions on select portions of data over time may be produced. For example, data corresponding to performance of a model on all evaluation data existing at each new training may be utilized, or data corresponding to recently added data may be utilized (such as to evaluate version performance on new content).

In various embodiments, a continuous learning model is used, and as new content is obtained, the model is continuously trained with the objective of constantly improving the performance and accuracy of the model. As each model is retrained, a new version is created, allowing a user to roll back to a previous version in the event that a model becomes corrupted or if accuracy declines. A user may readily determine performance trends of a model with GUI view 608. Further, different models (with the same prediction fields) can be compared to determine which model is providing more accurate results. Different versions of the same model can also be compared. In some embodiments, FIG. 6D may include one or more components that are the same or similar to one or more other components described hereby. For example, GUI view 608 may be the same or similar as a state of GUI 108. In other words, GUI view 608 may be presented via GUI 108. Embodiments are not limited in this context.

Figure 6E:
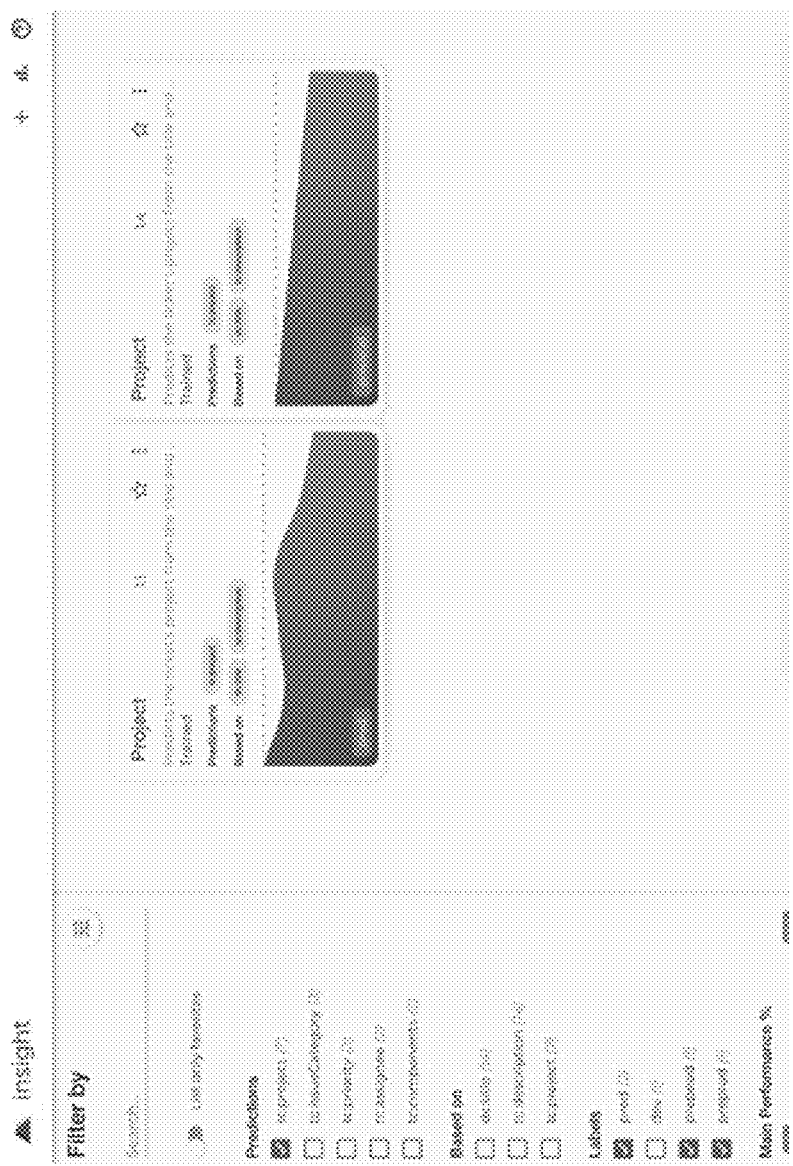
FIG. 6E illustrates an exemplary GUI view for ML model evaluation according to one or more embodiments described hereby.

FIG. 6E illustrates an exemplary GUI view 610 according to one or more embodiments described hereby. In various embodiments, GUI view 610 may be generated on GUI 108 by ML model developer 106 or ML model evaluator 112. In many embodiments, GUI view 610 may be generated by interface manager 308 or interface manager 410 as part of an intuitive user experience for evaluating, optimizing, and/or managing ML models. GUI view 610 illustrates comparison of different models (with the same prediction fields) to determine which model is providing more accurate results. Different versions of the same model can also be compared. In some embodiments, FIG. 6E may include one or more components that are the same or similar to one or more other components described hereby. For example, GUI view 610 may be the same or similar as a state of GUI 108. In other words, GUI view 610 may be presented via GUI 108. Embodiments are not limited in this context.

Figure 6F:
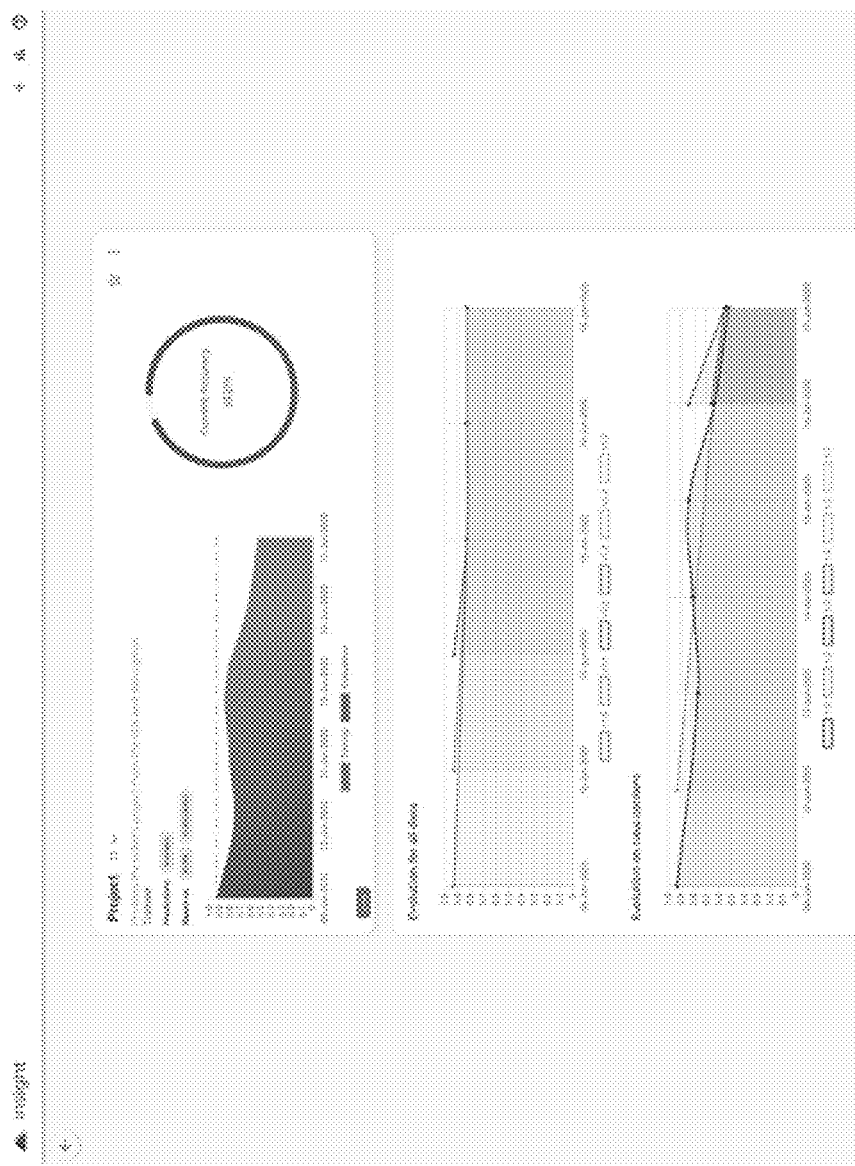
FIG. 6F illustrates an exemplary GUI view for ML model evaluation according to one or more embodiments described hereby.

FIG. 6F illustrates an exemplary GUI view 612 according to one or more embodiments described hereby. In various embodiments, GUI view 612 may be generated on GUI 108 by ML model developer 106 or ML model evaluator 112. In many embodiments, GUI view 612 may be generated by interface manager 308 or interface manager 410 as part of an intuitive user experience for evaluating, optimizing, and/or managing ML models. GUI view 612 illustrates a set of reports regarding a model that provides a user with a holistic view of the ML models and the overall performance of the system. In some embodiments, FIG. 6E may include one or more components that are the same or similar to one or more other components described hereby. For example, GUI view 610 may be the same or similar as a state of GUI 108. In other words, GUI view 610 may be presented via GUI 108. Embodiments are not limited in this context.

Figure 7:
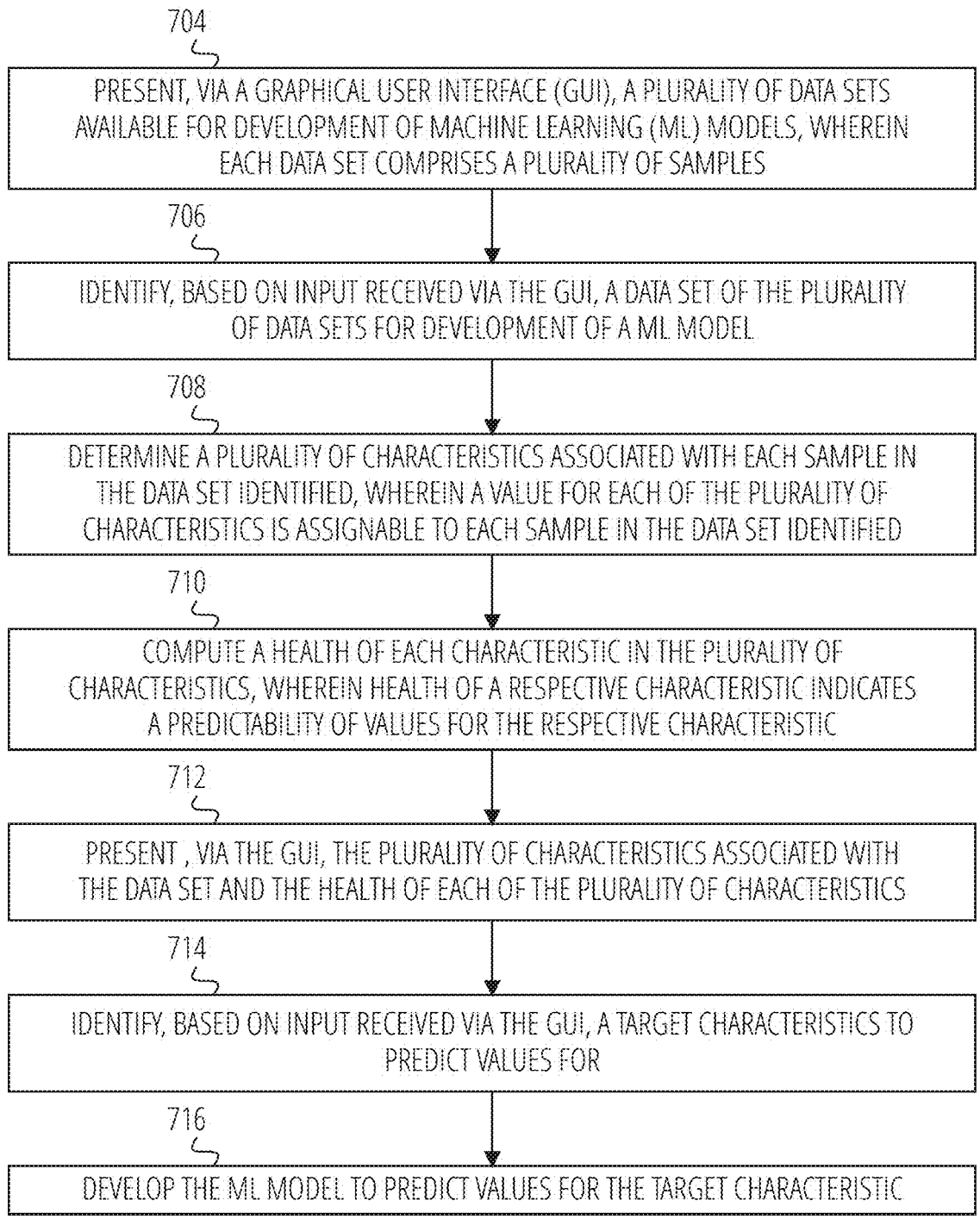
FIG. 7 illustrates an exemplary logic flow according to one or more embodiments described hereby.

FIG. 7 illustrates a logic flow 702, in accordance with non-limiting example(s) of the present disclosure. Logic flow 702 can being at block 704. At block 704 "present, via a graphical user interface (GUI), a plurality of data sets available for development of machine learning (ML) models, wherein each data set comprises a plurality of samples" a plurality of data sets comprising a plurality of samples and available for development of ML models are presented via a GUI. For example, data sets 104 may be presented via GUI 108 for development of ML models with ML model developer 106. In another example, an exemplary embodiment is included in GUI view 502.

Continuing to block 706 "identify, based on input received via the GUI, a data set of the plurality of data sets for development of a ML model" a data set of the plurality of data sets for development of a ML model may be identified based on input received via the GUI. For example, data set 202 may be identified for development of a ML model based on input received via GUI 108. At block 708 "determine a plurality of characteristics associated with each sample in the data set identified, wherein a value for each of the plurality of characteristics is assignable to each sample in the data set identified" a plurality of characteristics associated with each sample in the data set identified may be determined. Additionally, a value for each of the plurality of characteristics is assignable to each sample in the data set identified. For example, characteristics 206 associated with each sample 204 of data set 202 may be determined. Further, a value 208 is assignable to each of the characteristics 206 to each of samples 204 in data set 202.

Continuing to block 710 "compute a health of each characteristic in the plurality of characteristics, wherein health of a respective characteristic indicates a predictability of values for the respective characteristic" a health of each characteristic in the plurality of characteristics may be computed. Additionally, the health of each characteristic may indicate a predictability of values for the respective characteristic. For example, health evaluator 304 may compute a health for each of the characteristics 206. At block 712 "present, via the GUI, the plurality of characteristics associated with the data set and the health of each of the plurality of characteristics" the plurality of characteristics associated with the data set and the health of each of the plurality of characteristics may be presented via the GUI. For example, the plurality of characteristics associated with the data set and the health of each of the plurality of characteristics may be presented via GUI 108. In another example, an exemplary embodiment is included in GUI view 504.

Continuing to block 714 "identify, based on input received via the GUI, a target characteristic to predict values for" a target characteristic to predict value for may be identified based on input received via the GUI. For example, tc:project of GUI view 504 may be identified as the target characteristic to predict values for based on selection of tc:project via the check box and clicking next. At block 716 "develop the ML model to predict values for the target characteristic" the ML model to predict values for the target characteristic may be developed. For example, ML model developer 302 may develop an ML model to predict values for the target characteristic.

Figure 8:
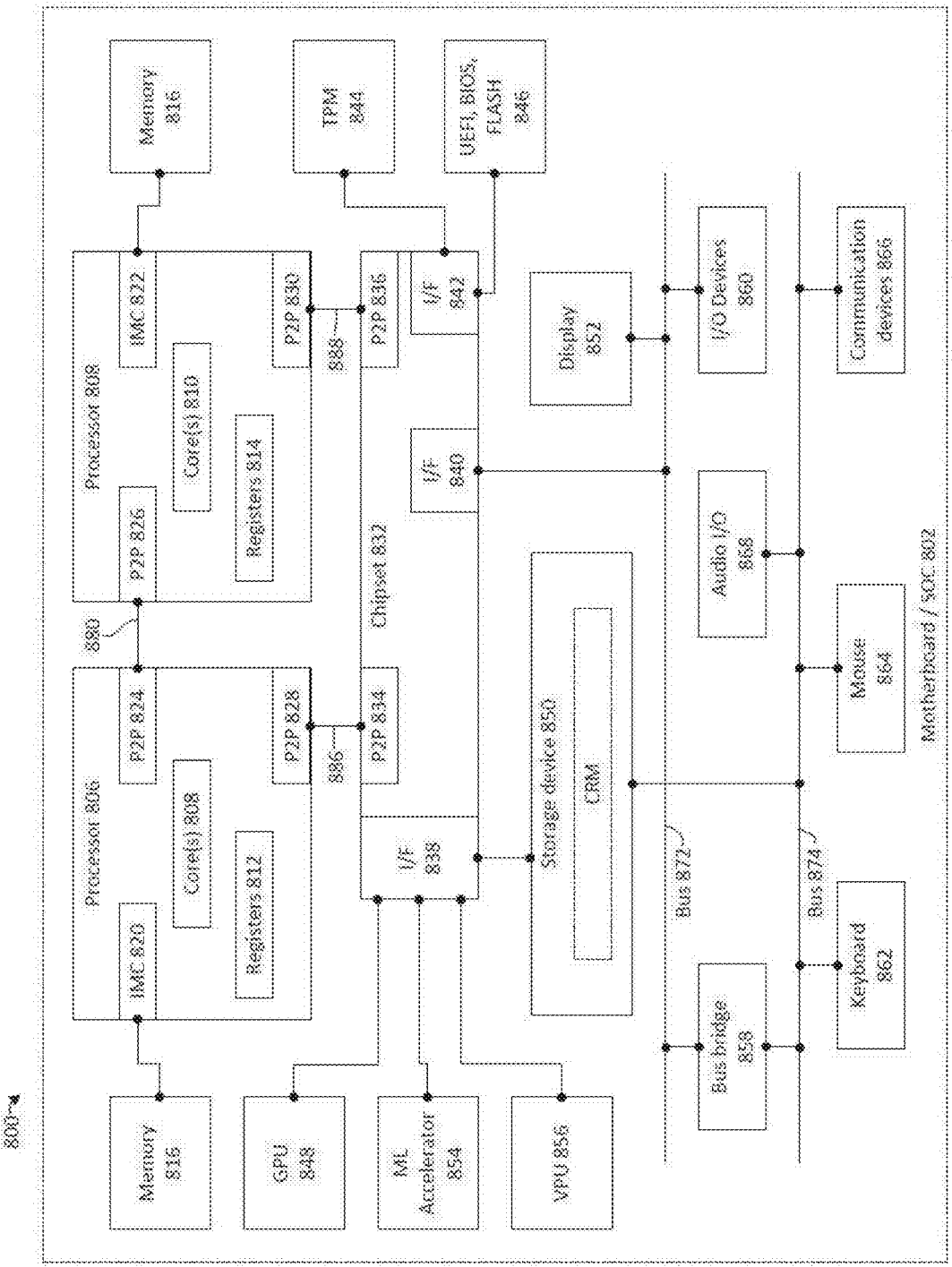
FIG. 8 illustrates exemplary aspects of a computing system according to one or more embodiments described hereby.

FIG. 8 illustrates an embodiment of a system 800 that may be suitable for implementing various embodiments described hereby. System 800 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of one or more components described hereby, such as ML model developer 106, GUI 108, ML model evaluator 112, ML model developer 302, or ML model evaluator 402. More generally, the computing system 800 is configured to implement all logic, systems, logic flows, methods, apparatuses, and functionality described hereby with reference to FIGS. 1-9. The embodiments are not limited in this context.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 832. Some platforms may include additional components and some platforms may only include sockets to mount the processors and/or the chipset. Furthermore, some platforms may not have sockets (e.g. SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes an integrated memory controller (IMC) 820 and point-to-point (P2P) interface 824 and P2P interface 828. Similarly, the processor 806 includes an IMC 822 as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-e). Storage device 850 can store instructions executable by circuitry of system 800 (e.g., processor 804, processor 806, GPU 848, ML accelerator 854, vision processing unit 856, or the like). For example, storage device 850 can store instructions for ML model developer 106, GUI 108, ML model evaluator 112, ML model developer 302, or ML model evaluator 402, logic flow 702, or the like.

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

Figure 9:
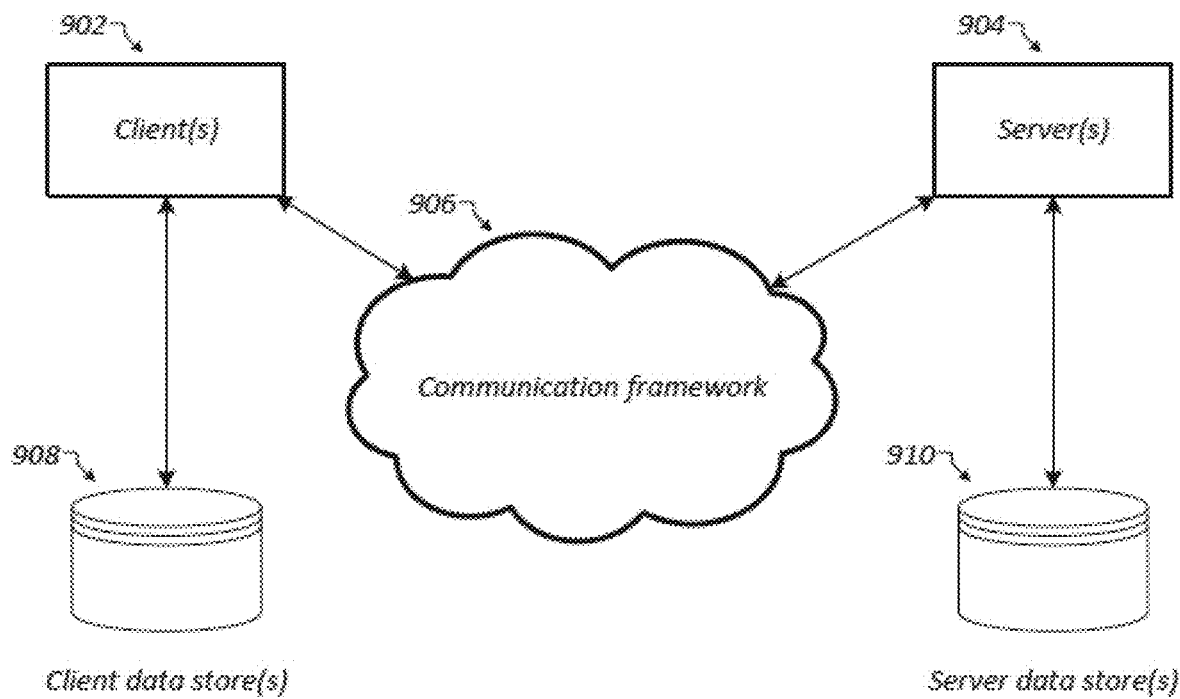
FIG. 9 illustrates exemplary aspects of a communications architecture according to one or more embodiments described hereby.

FIG. 9 illustrates a block diagram of an exemplary communications architecture 900 suitable for implementing various embodiments as previously described, such as communications between GUI 108 and ML model developer 106 and/or ML model developer 106. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments, communications architecture may include or implement one or more portions of components, applications, and/or techniques described hereby. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described hereby, such as in conjunction with storage of data received from any one of clients 902 on any of server data stores 910. In one or more embodiments, one or more of client data store(s) 908 or server data store(s) 910 may include memory accessible to one or more portions of components, applications, and/or techniques described hereby.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. A system comprising:
   one or more processors; and
   a memory comprising instructions that when executed by the one or more processors cause the one or more processors to:
   present, via a graphical user interface (GUI), a plurality of data sets available for development of machine learning (ML) models, wherein each data set comprises a plurality of samples;
   identify, based on input received via the GUI, a data set of the plurality of data sets for development of a ML model;
   determine a plurality of characteristics associated with each sample in the data set identified, wherein a value for each of the plurality of characteristics is assignable to each sample in the data set identified;
   compute a health of each characteristic in the plurality of characteristics, wherein health of a respective characteristic indicates a predictability of values for the respective characteristic;
   present, via the GUI, the plurality of characteristics associated with the data set and the health of each of the plurality of characteristics;
   identify, based on input received via the GUI, a target characteristic to predict values for; and
   identify, based on input received via the GUI, a set of predictor characteristics to
   utilize in prediction of values for the target characteristic; and
   develop the ML model to predict values for the target characteristic based on values for the set of predictor characteristics.

2. The system of claim 1 the memory comprising instructions that when executed by the one or more processors cause the one or more processors to:

determine an action to improve the health of a characteristic of the plurality of characteristics; and
present the action to improve the health of the characteristic via the GUI.

3. The system of claim 2, wherein the action to improve the health of the characteristic comprises one or more of adding samples to the data set identified and assigning values for the characteristic to one or more samples.

4. The system of claim 1, the memory comprising instructions that when executed by the one or more processors cause the one or more processors to compute the health of each characteristic in the plurality of characteristics with a ML algorithm.

5. The system of claim 1, the memory comprising instructions that when executed by the one or more processors cause the one or more processors to:
compute a health of each data set in the plurality of data sets, wherein health of a respective data set indicates a potential for training an accurate ML model based on the respective data set; and
present, via the GUI, the plurality of data sets available for development of machine learning (ML) models and the health of each of the plurality of data sets.

6. The system of claim 5, the memory comprising instructions that when executed by the one or more processors cause the one or more processors to:
determine an issue with the data set of the plurality of data sets to compute a health of the data set; and
present, via the GUI, the issue with the data set.

7. The system of claim 1, wherein the system is a distributed computing system, wherein different or same instructions are executed on multiple processors in communication over the Internet.

8. The system of claim 7, the memory comprising instructions that when executed by the one or more processors cause the one or more processors to:
determine a set of candidate characteristics based on the target characteristic;
compute a health of each candidate characteristic, wherein health of a respective candidate characteristic indicates potential to be a predictor for the target characteristic; and
present, via the GUI, the set of candidate characteristics and the health of each of the candidate characteristics.

9. The system of claim 8, the memory comprising instructions that when executed by the one or more processors cause the one or more processors to:
determine an action to improve the health of a candidate characteristic in the set of candidate characteristics; and
present the action to improve the health of the candidate characteristic via the GUI.

10. The system of claim 9, wherein the action to improve the health of the characteristic comprises assigning values for the characteristic to one or more samples.

11. The system of claim 1, wherein the data set comprises text-based documents and the target characteristic is associated with text in the text-based document.

12. At least one non-transitory computer-readable medium comprising a set of instructions that, upon execution by one or more processors, cause the one or more processors to:
present, via a graphical user interface (GUI), a plurality of data sets available for development of machine learning (ML) models, wherein each data set comprises a plurality of samples;
identify, based on input received via the GUI, a data set of the plurality of data sets for development of a ML model;
determine an least one characteristic associated with the plurality of samples in the data set identified, wherein a value for each of the at least one characteristics is assignable to the plurality of samples in the data set identified;
compute a health of the at least one characteristic in the plurality of characteristics, wherein health of a respective characteristic indicates a predictability of values for the respective characteristic;
present, via the GUI, the at least one characteristic associated with the data set identified and the health of the at least one characteristic;
identify, based on input received via the GUI, a target characteristic to predict values for;
develop the ML model to predict values for the target characteristic; and
either or both:
retrain the ML model based on input received to form a new version of the ML model, and present, via the GUI, the at least one characteristic associated with the data set identified and the health of the at least one characteristic based on the new version of the ML model; or
present, via the GUI, after new content is added to the data set identified to form a new data set, at least one characteristic associated with the new data set and the health of the at least one characteristic associated with the new data set.

13. The at least one non-transitory computer-readable medium of claim 12, comprising instructions that, in response to being executed by the one or more processors cause the one or more processors to:
determine an issue with a characteristic of the plurality of characteristics to compute a health of the characteristic; and
present the issue with the characteristic via the GUI;
wherein the issue with the characteristic comprises one or more of insufficient samples in the data set identified and insufficient values in the samples for the characteristic.

14. The at least one non-transitory computer-readable medium of claim 13, comprising instructions that, in response to being executed by the one or more processors cause the one or more processors to:
determine a possible solution to the issue with the characteristic; and
present the possible solution to the issue via the GUI.

15. The at least one non-transitory computer-readable medium of claim 12, comprising instructions that, in response to being executed by the one or more processors cause the one or more processors to present, via the GUI, a link to add samples to the data set identified or assign values for the characteristic to one or more samples.

16. The at least one non-transitory computer-readable medium of claim 12, comprising instructions that, in response to being executed by the one or more processors cause the one or more processors to:
retrain the ML model based on input received to form a new version of the ML model, and present via the GUI, the at least one characteristic associated with the new data set and the health of the at least one characteristic based on the new version of the ML model.

17. The at least one non-transitory computer-readable medium of claim 12, comprising instructions that, in response to being executed by the one or more processors cause the one or more processors to:

presenting, via the GUI, after the new content is added to the data set to form a new data set, at least one characteristic associated with the new data set and the health of the at least one characteristic associated with the new data set.

18. The at least one non-transitory computer-readable medium of claim 12, comprising instructions that, in response to being executed by the one or more processors cause the one or more processors to:

display on the GUI, performance trends associated with the health of the at least one characteristic of the ML model or the new ML model, or both as the new content is added to the data set to form the new data set.

19. A computer-implemented method, comprising:

presenting, via a graphical user interface (GUI), a plurality of data sets available for development of machine learning (ML) models, wherein each data set comprises a plurality of samples;

receiving input via the GUI, to identify a data set of the plurality of data sets for development of an ML model;

determining or receiving information on a determination of a plurality of characteristics associated with a plurality of samples in the data set identified, wherein a value for at least one of the plurality of characteristics is assignable to each sample in the data set identified;

receiving input via the GUI identifying a target characteristic to predict values for;

receiving a determination of or determining a set of candidate characteristics based on the target characteristic;

computing or receiving information on a computation of a health of at least one characteristic in the plurality of characteristics, wherein health of a respective characteristic indicates a predictability of values for the respective characteristic;

computing or receiving a computation of a health of at least one candidate characteristic, wherein health of a respective candidate characteristic indicates potential to be a predictor for the target characteristic; and presenting, via the GUI, the set of candidate characteristics and the health of at least one of the candidate characteristics.

20. The computer-implemented method of claim 19, comprising:

presenting, via the GUI, the plurality of characteristics associated with the data set identified and the health of each of the plurality of characteristics;

developing the ML model to predict values for the target characteristic.

* * * * *